United States Patent [19]

Goodall et al.

[11] 4,414,132

[45] Nov. 8, 1983

[54] OLEFIN POLYMERIZATION CATALYST COMPOSITIONS AND A PROCESS FOR THE POLYMERIZATION OF OLEFINS EMPLOYING SUCH COMPOSITIONS

[75] Inventors: Brian L. Goodall; Adrianus A. van der Nat; Willem Sjardijn, all of Amsterdam, Netherlands

[73] Assignee: Shell Oil Company, Houston, Tex.

[21] Appl. No.: 316,475

[22] Filed: Oct. 30, 1981

Related U.S. Application Data

[63] Continuation-in-part of Ser. No. 145,566, May 1, 1980.

[30] Foreign Application Priority Data

May 17, 1979 [GB] United Kingdom ................ 7917240

[51] Int. Cl.$^3$ .............................................. C08F 4/64
[52] U.S. Cl. ................................... 502/169; 526/125; 526/124
[58] Field of Search ...................... 252/429 B

[56] References Cited

U.S. PATENT DOCUMENTS

| | | | |
|---|---|---|---|
| 3,094,568 | 6/1963 | Hay et al. | 252/429 B |
| 3,878,124 | 4/1975 | Durand et al. | 252/429 |
| 4,107,415 | 8/1978 | Giannini | 526/114 |
| 4,115,319 | 9/1978 | Scata et al. | 252/429 B |
| 4,136,243 | 1/1979 | Appleyard et al. | 526/139 |
| 4,146,502 | 3/1979 | Yokoyama et al. | 252/429 B |
| 4,151,112 | 4/1979 | Wristers | 252/429 B |
| 4,182,691 | 1/1980 | Ueno et al. | 252/429 B |
| 4,210,738 | 7/1980 | Hermans et al. | 252/429 B X |
| 4,220,554 | 9/1980 | Scata et al. | 252/429 B |
| 4,224,183 | 9/1980 | Staiger | 252/429 B |
| 4,224,184 | 9/1980 | Staiger | 252/429 B |
| 4,239,650 | 12/1980 | Franke et al. | 252/429 B |
| 4,242,229 | 12/1980 | Fujii et al. | 252/429 B |
| 4,242,230 | 12/1980 | Ueno et al. | 252/429 B |
| 4,246,136 | 1/1981 | Ueno et al. | 252/429 B |
| 4,252,929 | 2/1981 | Kuroda et al. | 252/429 B |
| 4,329,253 | 5/1982 | Goodall et al. | 252/429 B |

FOREIGN PATENT DOCUMENTS

| | | |
|---|---|---|
| 4790 | 10/1979 | European Pat. Off. . |
| 7094 | 1/1980 | European Pat. Off. . |
| 2644440 | 4/1977 | Fed. Rep. of Germany . |
| 2340326 | 10/1977 | France . |
| 1359547 | 7/1974 | United Kingdom . |
| 1498862 | 1/1978 | United Kingdom . |
| 1554340 | 10/1979 | United Kingdom . |

*Primary Examiner*—Patrick Garvin

[57] ABSTRACT

A highly active and stereoselective olefin polymerization catalyst component is obtained by halogenating a magnesium compound of the formula $MgR_1R_2$ wherein $R_1$ is an alkoxide or aryloxide group and $R_2$ is an alkoxide or aryloxide group or halogen, with a halide of tetravalent titanium in the presence of a halohydrocarbon and an electron donor, and contacting the halogenated product with a tetravalent titanium halide.

31 Claims, No Drawings

OLEFIN POLYMERIZATION CATALYST COMPOSITIONS AND A PROCESS FOR THE POLYMERIZATION OF OLEFINS EMPLOYING SUCH COMPOSITIONS

This application is a continuation-in-part of U.S. Ser. No. 145,566, filed May 1, 1980.

The present invention relates to olefin polymerization catalyst compositions comprising a magnesium halide and a titanium halide and to a process for the polymerization of olefins using such catalyst compositions.

Numerous proposals are known from the prior art to provide olefin polymerization catalysts obtained by combining a component comprising a magnesium halide and a titanium halide with an activating organoaluminum compound. The polymerization activity and the stereospecific performance of such compositions may be improved by incorporating an electron donor (Lewis base) into the component comprising titanium, into the organoaluminum activating component or into both these components. The catalyst compositions of this type which have been disclosed in the prior art are able to produce olefin polymers in high yield, calculated as g polymer/g titanium, and also with the required high level of stereoregular polymeric material. However, this advantage is normally achieved at the detriment of polymer yield, calculated as g polymer/g aluminum. The high polymerization activities of the relevant catalyst compositions known from the prior art are only obtained when employing very large amounts of activating organoaluminum compounds, e.g., amounts, defined in the atomic ratio of aluminum to titanium in most cases 100:1 or more. In addition to this, many of the proposed catalyst compositions have the disadvantage that an adequate control of the molecular weight by polymerizing in the presence of hydrogen cannot be achieved without impairing the stereospecific performance of the catalyst compositions. Still further increase in activity of the catalysts is desirable since this will result in reduced ash contents in polymers produced without deashing or extraction steps in the process.

German Offenlegungsschrift No. 2,640,679 and its equivalent U.S. Pat. No. 4,115,319 are concerned with catalyst compositions comprising (a) a reaction product of an organoaluminum compound and an electron donor and (b) a solid component, comprising a magnesium halide and a titanium halide, which component has been obtained by halogenating a magnesium compound containing at most one halogen atom per magnesium atom with a halogenating agent other than a titanium halide, and reacting the solid so produced with a titanium compound. Suitable halogenating agents are said to be, i.a., halohydrocarbons. However, the halogenating action of such halohydrocarbons is very poor as will be shown in the comparative example included herein.

Halogenation of magnesium dialkoxides or diaryloxides by reacting with a titanium tetrahalide in the presence of an inert hydrocarbon solvent has been proposed in German Offenlegungsschrift No. 2,729,196 and British Pat. No. 1,554,340. The halogenated reaction product may be modified by reacting with an electron donor.

In accordance with the invention a very active solid titanium-containing constituent of olefin polymerization catalysts is the composition which is obtained by halogenating a magnesium compound of the formula $MgR_1R_2$ wherein $R_1$ is an alkoxide or aryloxide group and $R_2$ is an alkoxide or aryloxide group or halogen, with a halide of tetravalent titanium in the presence of a halohydrocarbon and an electron donor in liquid phase and subsequently contacting the halogenated product with a tetravalent titanium compound.

Catalysts in accordance with this invention comprise such solid titanium-containing catalyst constituents in combination with an organoaluminum cocatalyst and an electron donor or with an at least partial reaction product of an organoaluminum compound and an electron donor.

For convenience of reference, the solid titanium-containing catalyst constituent may be referred to herein as "procatalyst", the organoaluminum compound or its at least partial reaction product with an electron donor as "cocatalyst", and the electron donor compound which is used separately or partially or totally complexed with the organoaluminum compound as component of the total catalyst, as "selectivity control agent" (SCA). The cocatalyst and selectivity control agent are suitably such as are known for use with catalysts of the type of titanium halide supported on magnesium halide.

Since electron donor compounds are used both in the preparation of the procatalyst and of the total catalyst and since different electron donor compounds may be used for these purposes in production of a given catalyst, we may refer to the electron donor compound employed in preparation of the procatalyst or "electron donor" and that employed either complexed with the organoaluminum cocatalysts or separately as selectivity control agent.

Examples of halogen containing magnesium compounds that can be used as starting materials for the halogenating reaction are alkoxy and aryloxy magnesium halides, such as isobutoxy magnesium chloride, ethoxy magnesium bromide, phenoxy magnesium iodide, cumyloxy magnesium bromide and naphthenoxy magnesium chloride.

Preferred magnesium compounds to be halogenated are selected from magnesium dialkoxides and magnesium diaryloxides. In such compounds the alkoxide groups suitable have from 1 to 8 carbon atoms, and preferably from 2 to 8 carbon atoms. Examples of these preferred groups of compounds are magnesium di-isopropoxide, magnesium diethoxide, magnesium dibutoxide, magnesium diphenoxide, magnesium dinaphthenoxide and ethoxy magnesium isobutoxide. Magnesium diethoxide is particularly preferred.

In the halogenation with a halide of tetravalent titanium, the magnesium compounds are preferably reacted to form a magnesium halide in which the atomic ratio of halogen to magnesium is at least 1.2. Better results are obtained when the halogenation proceeds more completely, i.e., yielding magnesium halides in which the atomic ratio of halogen to chlorine is at least 1.5. The most preferred reactions are those leading to fully halogenated reaction products, i.e., magnesium-dihalides. Such halogenation reactions are suitably effected by employing a molar ratio of magnesium compound to titanium compound of 0.005:1 to 2:1, preferably 0.01:1 to 1:1. These halogenation reactions are conducted in the additional presence of an halohydrocarbon and an electron donor. An inert hydrocarbon diluent or solvent may also be present. When using an inert diluent or solvent, this should of course not be used as a complete substitute for the halohydrocarbon, for it is an essential feature of this invention that the halogenation reaction proceeds in the presence of a halohydrocarbon.

Suitable halides of tetravalent titanium include aryloxy- or alkoxy-di- and -trihalides, such as dihexanoxy-titanium dichloride, diethoxy-titanium dibromide, isopropoxy-titanium tri-iodide and phenoxy-titanium trichloride; titanium tetrahalides are preferred; most preferred is titanium tetrachloride.

Suitable halohydrocarbons are compounds such as butyl chloride, amyl chloride and the following more preferred compounds. Preferred aliphatic halohydrocarbons are halogen-substituted hydrocarbons with 1 to 12, particularly less than 9, carbon atoms per molecule, comprising at least two halogen atoms, such as dibromomethane, trichloromethane, 1,2-dichloroethane, dichlorobutane, 1,1,3-trichloroethane, trichlorocyclohexane, dichlorofluoroethane, trichloropropane, trichlorofluorooctane, dibromodifluorodecane, hexachloroethane and tetrachloroisooctane. Carbon tetrachloride and 1,1,3-trichloroethane are preferred aliphatic halohydrocarbons. Aromatic halohydrocarbons may also be employed, e.g., chlorobenzene, bromobenzene, dichlorobenzene, dichlorodibromobenzene, naphthyl chloride, chlorotoluene, dichlorotoluenes, and the like; chlorobenzene and dichlorobenzene are preferred aromatic halohydrocarbons.

The halogenation normally proceeds under formation of a solid reaction product which may be isolated from the liquid reaction medium by filtration, decantation or another suitable method and subsequently washed with an inert hydrocarbon diluent, such as n-hexane, iso-octane or toluene, to remove any unreacted material, including physically absorbed halohydrocarbon.

As compared with the magnesium chloride supported catalyst components that have been proposed in the prior art and which are prepared by halogenating magnesium compounds with a titaniumtetrahalide, the presence of the halohydrocarbon during halogenation of the magnesium compound, followed by a further contact with a tetravalent titanium compound in accordance with the invention, brings about an unexpected increase in the polymerization activity of the resulting catalyst compositions. The reasons for this increase are not exactly known. In the halogenation of magnesium dialkoxides or diaryloxides with titanium tetrahalides the halohydrocarbon has no halogenating action.

Subsequent to halogenation, the product is contacted with a tetravalent titanium halide such as a dialkoxy-titanium dihalide, alkoxy-titanium trihalide, phenoxy-titanium trihalide or titanium tetrahalide. The most preferred titanium compounds are titanium tetrahalides and especially titanium tetrachloride. This treatment increases the content of tetravalent titanium in the solid catalyst component. This increase should preferably be sufficient to achieve a final atomic ratio of tetravalent titanium to magnesium in the solid catalyst component of from 0.005 to 3.0, particularly of from 0.02 to 1.0. To this purpose the contacting with the tetravalent titanium chloride is most suitably carried out at a temperature of from 60° to 136° C. during 0.1–6 hours, optionally in the presence of an inert hydrocarbon diluent. Particularly preferred contacting temperatures are from 70° to 120° C. and the most preferred contacting periods are in between 0.5 to 3.5 hours. The treatment may be carried out in successive contacts of the solid with separate portions of TiCl$_4$.

After the treatment with tetravalent titanium chloride the catalyst component is suitably isolated from the liquid reaction medium and washed to remove unreacted titanium compound. The titanium content of the final, washed catalyst constituent is suitably between about 1.5 to 3.6 percent by weight or up to about 4.5 percent.

The preferred halogen atom, possibly contained in the magnesium compound to be halogenated, and contained in the titanium compound which serves as halogenating agent and in the tetravalent titanium chloride with which the halogenated product is contacted, is chlorine.

Suitable electron donors, which are used in combination with or reacted with an organoaluminum compound as selectivity control agents and which are also used in the preparation of the solid catalyst component are ethers, esters, ketones, phenols, amines, amides, imines, nitriles, phosphines, phosphites, stibines, arsines, phosphoramides and alcoholates. Examples of suitable donors are those referred to in U.S. Pat. No. 4,136,243 or its equivalent British Specification No. 1,486,194 and in British Specification No. 1,554,340 or its equivalent German Offenlegungsschrift No. 2,729,126. Preferred donors are esters and diamines, particularly esters of aromatic carboxylic acids, such as ethyl and methyl benzoate, p-methoxy ethyl benzoate, p-ethoxy methyl benzoate, ethyl acrylate, methyl methacrylate, ethyl acetate, dimethyl carbonate, dimethyl adipate, dihexyl fumarate, dibutyl maleate, ethylisopropyl oxalate, p-chloro ethyl benzoate, p-amino hexyl benzoate, isopropyl naphthenate, n-amyl toluate, ethyl cyclohexanoate, propyl pivalate, N,N,N',N'-tetramethylethylene diamine, 1,2,4-trimethyl piperazine, 2,3,4,5-tetraethyl piperidine and similar compounds. The donor used as selectivity control agent in the catalyst may be the same as or different from the donor used for preparing the titanium containing constituent. Preferred electron donors for use in preparing the titanium constituent are ethyl benzoate and p-methyl toluate. Preferred are selectivity control agent in the total catalyst is ethyl anisate (p-methoxy ethyl benzoate).

The organoaluminum compound to be employed as cocatalyst may be chosen from any of the known activators in olefin polymerization catalyst systems comprising a titanium halide but is most suitably free of halogens. While trialkylaluminum compounds, dialkylaluminum halides and dialkylaluminum alkoxides may be used, trialkylaluminum compounds are preferred, particularly those wherein each of the alkyl groups has 2 to 6 carbon atoms, e.g., triethylaluminum, tri-n-propylaluminum, triisobutylaluminum, triisopropylaluminum and dibutyl-n-amylaluminum.

Preferred proportions of selectivity control agent, employed separately, in combination with, or reacted with an organoaluminum compound, calculated as mol per mol aluminum compound, are in the range from 0.1 to 1.0, particularly from 0.2 to 0.5.

Proportions of electron donor contained in the solid catalyst component, calculated as mol per mol of magnesium, are suitably in the range of from 0.01 to 10, e.g., from 0.05 to 10 and from 0.1 to 5.0 and especially from 0.01 to 1.0.

To prepare the final polymerization catalyst composition, procatalyst, cocatalyst and selectivity control agent, if used separately, may be simply combined, most suitably employing a molar ratio to produce in the final catalyst an atomic ratio of aluminum to titanium of from 1 to 150, and suitably from about 10 to about 150. The catalysts of this invention tend to exhibit very good activity at much lower Al:Ti ratios, e.g., below 80:1 and even below 50:1, than prior art catalysts of the same type. It may, however, be advantageous under some conditions to employ them at higher Al:Ti ratios. Increasing the Al:Ti ratio tends to increase catalyst activity at the expense of increased catalyst residue in the unextracted product. These factors, as well as the desired level of isotacticity, will be considered in selecting the Al:Ti ratio for any given process and desired product. In general, Al:Ti ratios in the range of 30:1 to 100:1 and especially of about 50:1 to 80:1 will be found advantageous.

The present invention is also concerned with a process for polymerizing an alpha monoolefin such as ethylene or butylene, preferably propylene, employing the novel catalyst components and compositions. These polymerizations may be carried out by any of the conventional techniques, such as gas phase polymerization or slurry polymerization using liquid monomer or an inert hydrocarbon diluent as liquid medium. Hydrogen may be used to control the molecular weight of the polymer without detriment to the stereospecific performance of the catalyst compositions. Polymerization may be effected batchwise or continuously with constant or intermittent supply of the novel catalyst compositions or one or more of the catalyst components to the polymerization reactor. The activity and stereospecificity of the novel catalyst compositions are so pronounced that there is no need for any catalyst removal or polymer extraction techniques. Total metal residues in the polymer, i.e., the combined aluminum, chlorine and titanium content, can be as low as 200 ppm, even less than 100 ppm, as will be shown in the examples.

EXAMPLE 1

The polymerization activity of the various catalyst systems described in Examples 2–5 is determined by the following standard polymerization test: Triethylaluminum (Act) and p-methoxy ethyl benzoate (ED) were mixed in varying amounts during 5 minutes at room temperature in 40 ml iso-octane and introduced into a 1 l autoclave containing 364 g liquid propylene and hydrogen (partial hydrogen pressure 98 kPa). Immediately thereafter the solid catalyst component was introduced into the reactor, in the form of a suspension in 20 ml iso-octane. The autoclave was then heated to 60° C. in 5 minutes and the polymerization was continued at that temperature and a total pressure of 2650 kPa, while stirring the contents of the reactor.

After polymerization, remaining unconverted liquid propylene was removed by depressurizing and the polymer was analyzed to determine the contents of Ti, Al and Cl in the polymer and the contents of amorphous material (XS)—i.e., the percentage of material remaining soluble when cooling a solution of polymer in xylene from its boiling point to room temperature. No intermediate treatments to deactivate the catalyst or to purify the polymer by extraction were employed.

In the Table given below the Al/Ti molar ratio in the catalyst systems is expressed as a ratio of x:1, x having the values shown.

EXAMPLE 2

10 g of magnesium turnings (412 mat) was reacted at room temperature with ethanol employing a mixture comprising 100 ml ethanol, 20 ml xylene, 5 mg of mercuric chloride (0.02 mmol) and 3 mg of iodine (0.02 mmol). The reaction took 5 hours for completion. Subsequently, the liquid phase was removed by distillation and the resulting solid was dried under a nitrogen vacuum.

10 mmol of the magnesium di-ethoxide so prepared was suspended in 15 ml carbon tetrachloride and at 75° C. 0.48 ml ethyl benzoate (3.3 mmol) and 15 ml of titanium tetrachloride (136 mmol) were added. The suspension was stirred at that temperature for 2 hours. The solid formed was isolated from the reaction medium by decantation and washed five times with iso-octane (component a).

This component a was suspended in 15 ml titanium tetrachloride (136 mmol) at 80° C. and the suspension was stirred at that temperature for 2 hours. After decanting the solid was washed five times with isooctane. The product so obtained (component b) had a titanium content, calculated as metal on the total weight of the solid, of 2.3% wt.

EXAMPLE 3

For comparison purposes another solid catalyst component was prepared by suspending 50 mmol of the magnesium diethoxide prepared as described in Example 2 in a mixture of 75 ml toluene and 16.7 mmol ethyl benzoate. Then 75 ml liquid TiCl$_4$ (180 mmol) was added and the mixture was stirred at 80° C. during two hours. After isolating the solid by filtration, the solid was washed five times with iso-octane at 70° C. There resulted a yellowish solid comprising 3.4% wt of Ti (component c).

EXAMPLE 4

3.6 mmol of butyl magnesium isopropoxide dissolved in 8.0 ml iso-octane was mixed with 10 ml iso-octane, 15 ml carbon tetrachloride and 157 mg ethyl benzoate (1 mmol) at −40° C. Then at that temperature, 6 ml titanium tetrachloride (54 mmol) was added and the mixture was slowly warmed up to 70° C. in 0.5 hours and stirring was continued for another hour. The solid formed was isolated and washed three times with iso-octane. Then, the solid was suspended in 25 ml titanium tetrachloride and stirred for 2 hours at 110° C. After decantation, the solid (component d) was washed six times with iso-octane. The titanium content in this component was 3.6% wt.

The polymerization results obtained when testing components (a) to (d) in the polymerization run described in Example 1 are represented in the following Table.

EXAMPLE 5

In order to see whether magnesium diethoxide can be halogenated by reaction with carbon tetrachloride, 10 mmol magnesium diethoxide was suspended in a mixture of 15 ml carbon tetrachloride (155 mmol) and 3.3 mmol ethyl benzoate and the suspension was stirred at 75° C. for 2 hours. After washing five times with iso-octane, there resulted a white solid comprising only 0.23% wt of Cl, thus showing that only a negligible halogenation had taken place. Hence, this example serves for comparison only.

TABLE

| Solid Component | | a* | b | b | c* | c* | d |
|---|---|---|---|---|---|---|---|
| Solid | mg | 13.2 | 17 | 8 | 9 | 25 | 10 |

TABLE-continued

| Solid Component | | a* | b | b | c* | c* | d |
|---|---|---|---|---|---|---|---|
| Component | | | | | | | |
| Act. | mmol | 0.3 | 0.3 | 0.3 | 0.3 | 2.1 | 0.3 |
| ED | mmol | 0.09 | 0.09 | 0.09 | 0.09 | 0.6 | 0.09 |
| Al/Ti | x | 43 | 38 | 76 | 47 | 118 | 41 |
| Time | hrs | 1.3 | 1.3 | 1.8 | 0.7 | 3.1 | 3 |
| Yield | g | 14 | 123 | 60 | 6 | 173 | 45 |
| Yield | kg/g cat | 1.1 | 7.3 | 7.1 | 0.7 | 6.9 | 4.5 |
| Yield | kg/g Ti | 41 | 324 | 316 | 19.5 | 203 | 128 |
| XS | % | 6.4 | 3.9 | 4.3 | — | 4.8 | — |
| Ti | ppm | 19 | 3 | 3 | — | 4 | 7 |
| Al | ppm | 403 | 71 | 127 | — | 320 | 180 |
| Cl | ppm | 214 | 56 | 58 | — | 52 | 133 |

*for comparison

What is claimed is:

1. An olefin polymerization catalyst composition comprising an organoaluminum compound, a selectivity control agent and a solid component which has been obtained by halogenating a magnesium compound of the formula MgR'R" wherein R' is an alkoxide or aryloxide group and R" is an alkoxide or aryloxide group or halogen, with a halide of tetravalent titanium in the presence of a halohydrocarbon and an electron donor, contacting the halogenated product with a tetravalent titanium halide, washing it to remove unreacted titanium compounds, and recovering the solid product.

2. An olefin polymerization catalyst composition according to claim 1 wherein said organoaluminum compound and selectivity control agent are employed as an at least partially prereacted reaction product.

3. A composition according to claim 1 in which the halide of tetravalent titanium and the tetravalent titanium halide are each a titanium tetrahalide, and the selectivity control agent and the electron donor are ethers, esters, amines or phosphines.

4. A composition according to claim 1 in which the halide of tetravalent titanium and the tetravalent titanium halide are each titanium tetrachloride, and the selectivity control agent and the electron donor are esters of aromatic carboxylic acids.

5. A composition according to claim 4 in which the electron donor in the solid component is ethyl benzoate.

6. A composition according to claim 1 in which the atomic ratio of aluminum to titanium is from 10:1 to 80:1.

7. A composition according to claim 4 wherein said halohydrocarbon is carbon tetrachloride.

8. A composition according to claim 4 in which said halohydrocarbon is an aliphatic halohydrocarbon of 1 to 12 carbon atoms which has at least two chlorine atoms per molecule.

9. A composition according to claim 4 wherein said halohydrocarbon is chlorobenzene or a dichlorobenzene.

10. A solid component for olefin polymerization catalyst compositions which component has been obtained by halogenating a magnesium compound of the formula MgR'R" wherein R' is an alkoxide or aryloxide group and R" is an alkoxide or aryloxide group or halogen, with a halide of tetravalent titanium in the presence of a halohydrocarbon and an electron donor, contacting the halogenated product with a tetravalent titanium halide, washing it to remove unreacted titanium compounds, and recovering the solid product.

11. A composition according to claim 10 in which the halide of tetravalent titanium and the tetravalent titanium halide are each a titanium tetrahalide, and electron donor is an ether, ester, amine or phosphine.

12. A composition according to claim 10 in which the halide of tetravalent titanium and the tetravalent titanium halide are each titanium tetrachloride, and the electron donor is an ester of an aromatic carboxylic acid.

13. A composition according to claim 12 in which the electron donor is ethyl benzoate.

14. A composition according to claim 13 wherein said halohydrocarbon is carbon tetrachloride.

15. A composition according to claim 13 in which said halohydrocarbon is an aliphatic chlorohydrocarbon of 1 to 12 carbon atoms which has at least two chlorine atoms per molcule.

16. A composition according to claim 13 wherein said halohydrocarbon is chlorobenzene or a dichlorobenzene.

17. A solid component for olfin polymerization catalyst compositions, containing titanium and magnesium in an atomic ratio of Ti:Mg in the range from 0.02:1 to 1:1, which component has been obtained by contacting a compound MgR'R", in which R' and R" are alkoxy or aryloxy groups of 2 to 8 carbon atoms, in a first contacting step with titanium tetrachloride, a chlorohydrocarbon having 1 to 12 carbon atoms per molecule and an electron donor, resulting in a solid which contains Mg, Ti, Cl and electron donor and which has a Mg:Cl atomic ratio of at least 1.5, contacting the resulting solid with titanium tetrachloride in a separate contacting step, washing it to remove unreacted titanium compounds, and recovering the solid reaction product.

18. A solid component for olefin polymerization catalyst compositions, containing titanium and magnesium in an atomic ratio of Ti:Mg in the range from 0.02:1 to 1:1, which component has been obtained by converting magnesium diethoxide to magnesium dichloride by reaction with titanium tetrachloride in a molar ratio of magnesium diethoxide:titanium tetrachloride in the range from 0.01:1 to 1.0:1 in a first contacting step in the presence of a chlorohydrocarbon having 1 to 12 carbon atoms per molecule and of an ester of an aromaic caboxylic acid as electron donor, resulting in a solid which contains Mg, Ti, Cl and electron donor, contacting the resulting solid with titanium tetrachloride in a separate contacting step, washing it to remove unreacted titanium compounds, and recovering the solid reaction product.

19. A composition according to claims 17 or 18 in which said chlorohydrocarbon is carbon tetrachloride.

20. A composition according to claims 17 or 18 in which said chlorohydrocarbon is an aliphatic compound which has at least two chlorine atoms per molecule.

21. A composition according to claims 17 or 18 wherein said chlorohydrocarbon is chlorobenzene.

22. An olefin polymerization catalyst composition comprising an organoaluminum compound, a selectivity control agent, and a solid component according to claims 17 or 18 in which the atomic ratio of aluminum to titanium is from 10:1 to 80:1.

23. An olefin polymerization catalyst composition according to claim 22 wherein said organoaluminum compound and selectivity control agent are employed as an at least partially prereacted reaction product.

24. An olefin polymerization catalyst composition according to claim 22 wherein the organoaluminum compound is a trialkylaluminum and the selectivity control agent and the electron donor are esters of aromatic carboxylic acids.

25. An olefin polymerization catalyst composition according to claim 24 wherein the organoaluminum compound is triethylaluminum and the selectivity control agent is ethyl anisate.

26. A method for the preparation of a solid component for olefin catalyst compositions, comprising halogenating a magnesium compound of the formula MgR'R" wherein R' is an alkoxide or aryloxide group and R" is an alkoxide or aryloxide group or halogen, with a halide of tetravalent titanium in the presence of a halohydrocarbon and an electron donor, separating the solid reaction product from the reaction mixture, optionally washing it with an inert diluent to remove any unreacted material, then contacting the halogenated product with a tetravalent titanium halide, separating the resulting solid from the liquid medium, and washing it with an inert diluent to remove all unreacted titanium compounds.

27. A method for the preparation of a solid component for olefin catalyst compositions, comprising contacting a compound MgR'R", in which R' and R" are alkoxy or phenoxy groups of 2 to 8 carbon atoms, in a first contacting step with titanium tetrachloride, a chlorohydrocarbon having 1 to 12 carbon atoms per molecule and an electron donor, resulting in a solid which contains Mg, Ti, Cl and electron donor and which has an Mg:Cl atomic ratio of at least 1.5, separating the solid reaction product from the reaction mixture, optionally washing it with an inert diluent to remove any unreacted material, then contacting the resulting solid with titanium tetrachloride, separating the resulting solid from the liquid medium, and washing it with an inert diluent to remove all unreacted titanium compounds.

28. A method for the preparation of a solid component for olefin polymerization catalyst compositions, comprising converting magnesium diethoxide to magnesium dichloride by reaction with titanium tetrachloride in a molar ratio of magnesium diethoxide:titanium tetrachloride in the range from 0.01:1 to 1.0:1 in a first contacting step in the presence of a chlorohydrocarbon having 1 to 12 carbon atoms per molecule and of an ester of an aromatic carboxylic acid as electron donor, resulting in a solid which contains Mg, Ti, Cl and electron donor, separating the solid reaction product from the reaction mixture, optionally washing it with an inert diluent to remove any unreacted material, then contacting the resulting solid with titanium tetrachloride, separating the resulting solid from the liquid medium, and washing it with an inert diluent to remove all unreacted titanium compounds.

29. A method according to claims 27 or 28 in which said chlorohydrocarbon is carbon tetrachloride.

30. A method according to claims 27 or 28 in which said chlorohydrocarbon is an aliphatic compound which has at least two chlorine atoms per molecule.

31. A method according to claims 27 or 28 in which said chlorohydrocarbon is chlorobenzene.

* * * * *